Jan. 12, 1960 J. H. GALLICHOTTE 2,920,822

SUBTRACTION CIRCUITS UTILIZING ELECTRICAL DELAY LINES

Filed Sept. 16, 1958 4 Sheets-Sheet 1

INVENTOR.
JOHN H. GALLICHOTTE

BY Walter J. Malley

ATTORNEY

Jan. 12, 1960 J. H. GALLICHOTTE 2,920,822

SUBTRACTION CIRCUITS UTILIZING ELECTRICAL DELAY LINES

Filed Sept. 16, 1958 4 Sheets-Sheet 3

United States Patent Office 2,920,822

Patented Jan. 12, 1960

2,920,822

SUBTRACTION CIRCUITS UTILIZING ELECTRICAL DELAY LINES

John H. Gallichotte, Sunnyvale, Calif., assignor to International Business Machines Corporation, New York, N.Y., a corporation of New York Application September 16, 1958, Serial No. 761,370

11 Claims. (Cl. 235—173)

Figure 1:
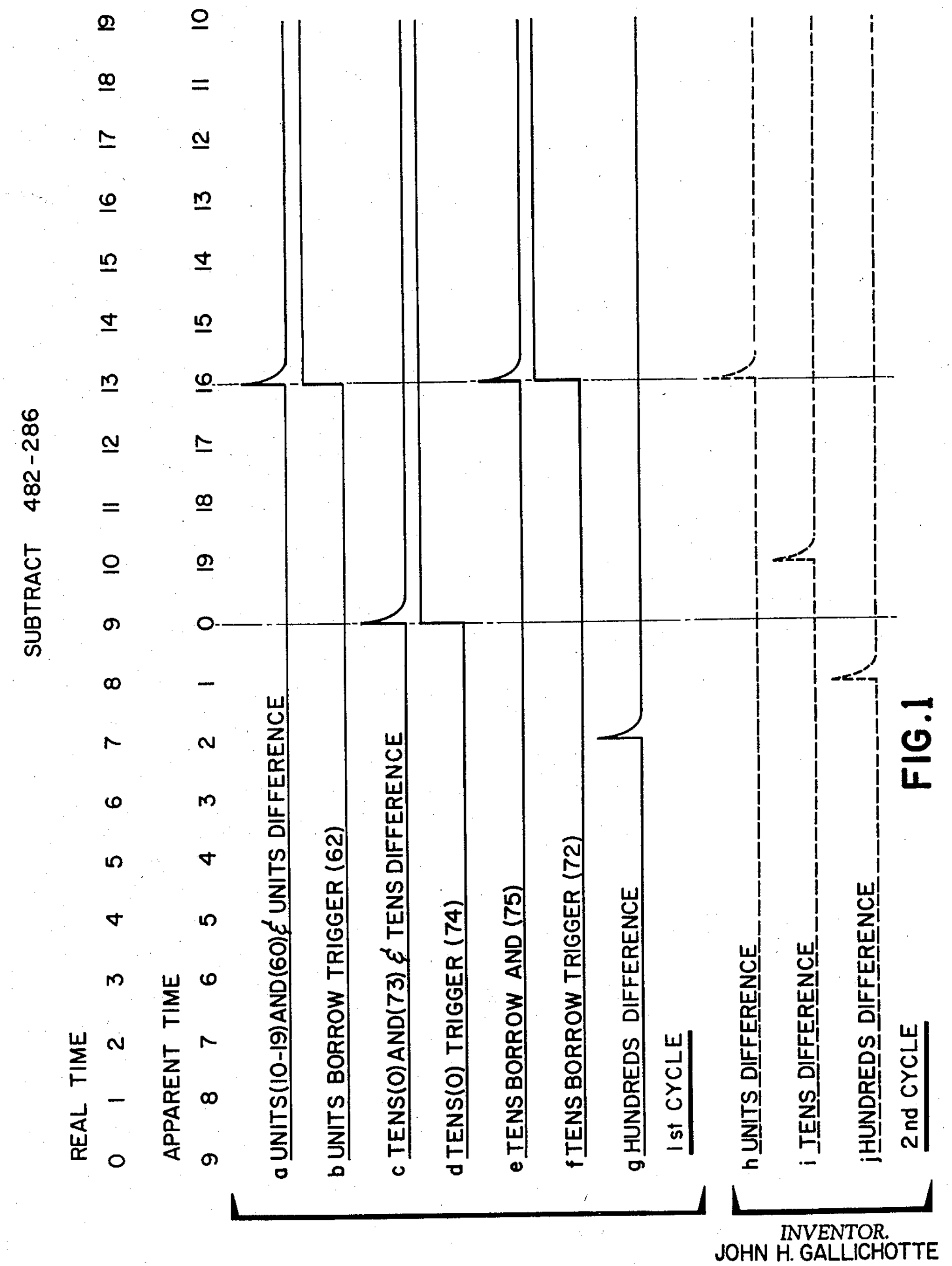

The present invention relates in general to arithmetic circuits and relates more particular to such circuits utilizing delay lines to perform subtraction operations.

The use of delay lines to perform arithmetic addition is disclosed in my co-pending application Serial No. 758,078, filed August 29, 1958, assigned to the same assignee as the present application. In this co-pending application addition is performed by delaying pulses in delay lines by amounts proportional to the numbers to be added and the total delay undergone by the pulses is detected to obtain a measure of the sum of the numbers. Further, in accordance with the invention disclosed in the above identified application, carries resulting from the addition are entered by means of carry delay lines which are selectively connected to provide an additional delay for the pulses corresponding to the entering of a carry in the addition operation.

The present invention is directed to apparatus for performing subtraction by means of delay lines. By means of a novel connection of the delay lines, subtraction can be performed by the addition of delays in the delay lines. This novel method of connection involves representing the minuend digit in each of the orders in terms of the nines complement of the minuend, so that a pulse is delayed a first amount corresponding to the nines complement of the minuend digit. The pulse is then delayed an additional amount corresponding to the value of the subtrahend digit, so that the total delay corresponds to the sum of the subtrahend digit and the nines complement of the minuend digit. This delayed pulse is then supplied to suitable apparatus, such as a plurality of coincidence detection circuits, to determine the total delay undergone by the pulse. In accordance with the present invention, the coincidence circuits are connected so as to indicate the total delay in terms of the nines complement of the delay so that the actual coincidence circuit output corresponds to the difference between the minuend digit and the subtrahend digit.

Further, in accordance with the present invention there is provided borrow delay means between each of the different numerical orders to introduce into the pulse in each of the orders an additional delay representing a borrow from the preceding order. The generation of a borrow in a given order may result either when the subtrahend in that order is greater than the minuend, or when the difference in a given order is zero and there is a borrow from the order preceding the given order. In either case, the apparatus of the present invention provides for generating and entering this borrow in the novel borrow delay means.

The apparatus of the present invention operates generally on a two-cycle basis. In the first of these cycles the pulse travels through the different delay elements for the different orders and is delayed therein by amounts corresponding to the subtrahend digit and the nines complement of the minuend digit. The pulse is then supplied to coincidence detection circuits which indicate the difference between the minuend digits and the subtrahend digits, as discussed above. Also during this first cycle, any borrows which are the result of the subtraction are generated, and these borrows may or may not be entered in the subtraction depending upon the relative times of occurrence of the borrow and the difference. On the second cycle, borrows generated but not entered during the first cycle are entered in the appropriate orders, so that at the end of the second and all subsequent cycles the output of the apparatus indicates the true differences between the numbers involved in the subtraction taking into account the effects of borrows from prior orders.

It is therefore an object of the present invention to provide improved apparatus for performing subtraction utilizing delay lines.

It is a further object of the present invention to provide apparatus for performing subtraction utilizing electrical delay lines in which an electrical pulse is delayed by a first amount corresponding to the nines complement of the minuend digit and is additionally delayed a second amount corresponding to the subtrahend digit, and the total delay undergone is indicated in terms of its nines complement to provide an indication of the difference between the minuend and the subtrahend digits.

It is a further object of the present invention to provide improved apparatus for performing subtraction utilizing electrical delay lines in which electrical pulses are delayed by amounts representing the minuend and the subtrahend digits, and these pulses are delayed additional amounts corresponding to borrows resulting from such subtraction.

It is an additional object of the present invention to provide apparatus for performing subtraction utilizing electrical delay lines in which for a given order a pulse is delayed a first amount corresponding to the nines complement of the minuend digit and is delayed a second amount corresponding to the subtrahend digit, and may be delayed an additional amount representing a borrow from an order prior to the given order, and the total delay undergone by the pulse for each order is indicated in terms of its nines complement to indicate the difference between the minuend and the subtrahend digits.

Other objects of the invention will be pointed out in the following description and claims and illustrated in the accompanying drawings which disclose, by way of example, the principle of the invention and the best mode which has been contemplated of applying that principle.

Figure 2A:
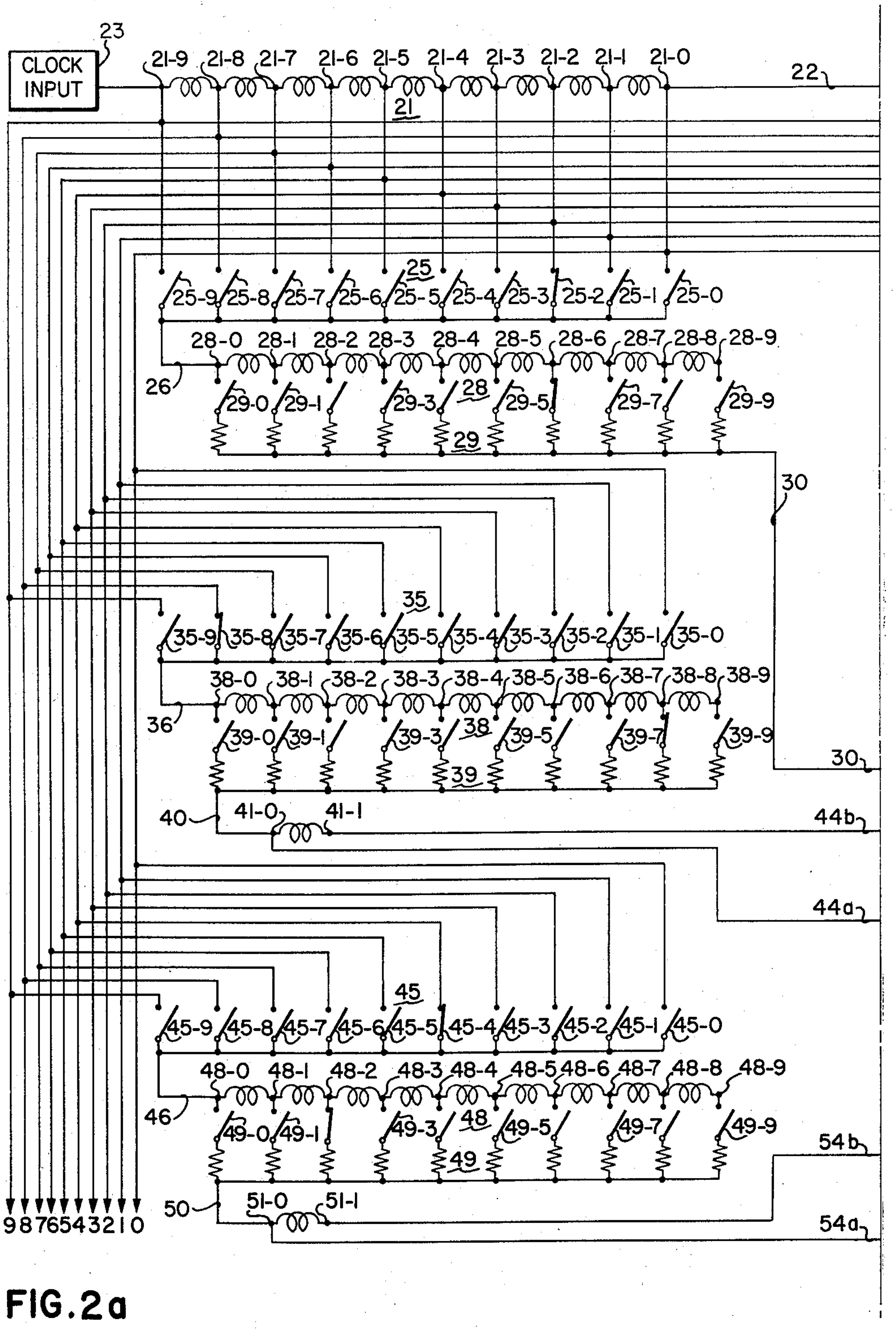
Figure 2B:
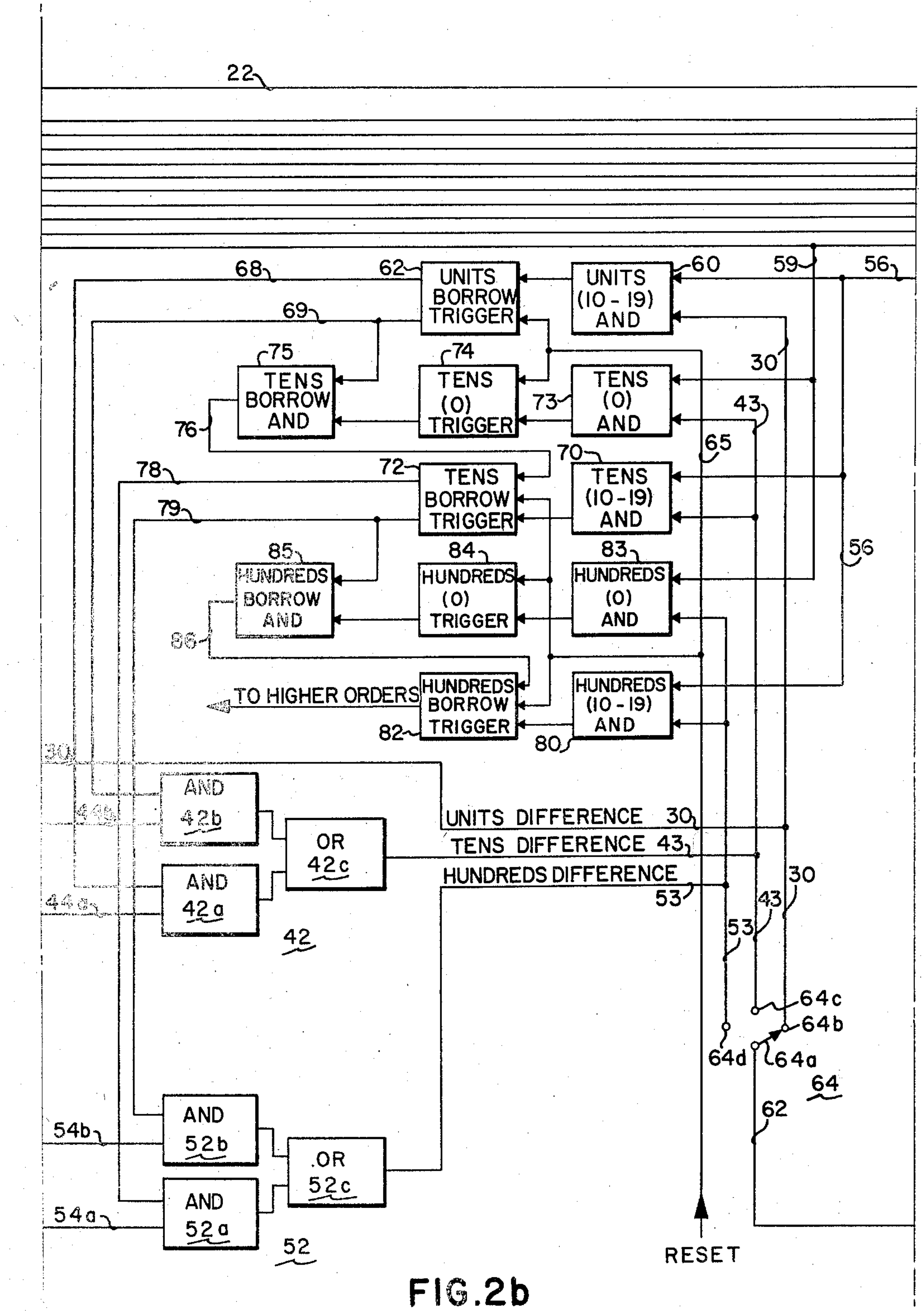
Figure 2C:
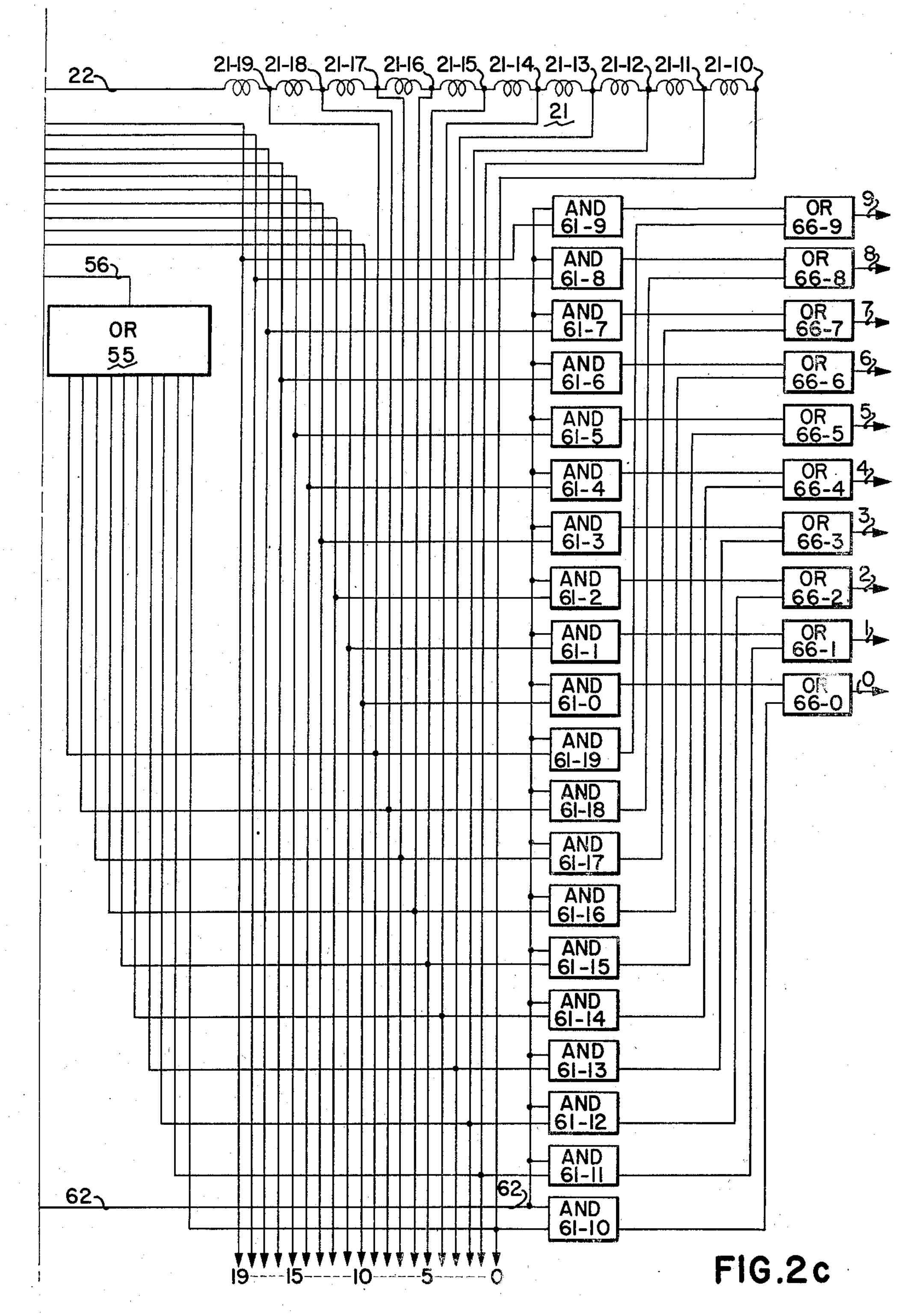

In the drawings:

Fig. 1 is a timing diagram illustrating the time relationships among pulses in different portions of the apparatus of the present invention in performing a representative subtraction operation; and Figs. 2*a*, 2*b* and 2*c*, when laid side-by-side, illustrate apparatus in accordance with the present invention for performing subtraction in three orders.

Reference may now be had to Figs. 2*a*, 2*b* and 2*c* which, when laid side-by-side, illustrate one embodiment of the present invention for subtracting in three orders, such as units, tens and hundreds. The apparatus includes a delay line 21 having equal sections therein represented by taps 21–0 through 21–19. To clarify the drawings, sections 21–0 through 21–9 (Fig. 2*a*) are shown separated from sections 21–10 through 21–19 (Fig. 2*c*) and connected thereto by a conductor 22, but it will be understood that in practice the delay line may be a unitary structure.

Delay line 21 serves as a master delay line for the apparatus illustrated and has supplied thereto an input pulse from a clock device 23. The pulses supplied from the different output taps of sections 21–0 through 21–9 of delay line 21 are supplied in parallel to the units, tens and hundreds orders of the apparatus. It will be noted that the taps of delay line 21 are not arranged sequentially by number. That is, the input from clock 23 is first supplied to tap 21–9 and travels through delay line 21 to taps 21–8, 21–7, 21–6, etc. to tap 21–0. After tap 21–0, the taps on delay line 21 are numbered in reverse sequential order from 21–19 to 21–10 (Fig. 2*c*). This method of numbering the delay line taps provides the means for representing the minuend digits by their nines complements so that the sum of the subtrahend digit delay and the nines complement of the minuend digit delay represents the difference between the minuend and subtrahend digits.

The minuend selection switches for the units order include a plurality of switches 25–0 through 25–9 for entering the selected minuend digit in the units order. One terminal of each of these minuend selection switches is connected to the corresponding tap on delay line 21, while the other terminals of these switches are connected in common through a conductor 26 to the input of a subtrahend delay line 28. Subtrahend delay line 28 has a plurality of equal delay sections represented by taps 28–0 through 28–9 which are sequentially arranged by number. Each of these taps is connected to one terminal of a corresponding subtrahend selection switch 29–0 through 29–9, and the other terminals of switches 29 are connected in common to a conductor 30 which leads to the difference determining apparatus, as will be described more fully below.

Thus, in subtracting in the units order, a pulse from clock 23 travels through master delay line 21 to the tap thereof corresponding to the closed one of minuend selection switches 25, then through conductor 26 to subtrahend delay line 28, through subtrahend delay line 28 to the tap thereof corresponding to the closed subtrahend selection switch 29, and then through conductor 30 to the difference determining apparatus. It will be noted that, owing to the method of labeling the taps of delay line 21 and switches 25, closing of any given one of switches 25 results in the connection of a number of sections of delay line 21 equal to the nines complement of the digit represented by the given one of switches 25. For example, if switch 25–3 is closed, there are six units of delay between clock 23 and switch 25–3; similarly, if switch 25–8 is closed, there is a delay of one unit between clock 23 and this switch.

A tens order minuend selection switch bank 35 is provided having a plurality of switches 35–0 through 35–9. One terminal of each of these switches is connected to the corresponding tap on delay line 21, in parallel with the switches of units order minuend selection switch bank 25. It will be noted that the labeling and connection of switches 35 results in a delay corresponding to the nines complement of the closed switch digit, similar to that described above for switches 25. The other terminals of switches 35–0 through 35–9 are connected in common to a conductor 36 which leads to the input of a tens order subtrahend delay line 38 having a plurality of equal sections represented by taps 38–0 through 38–9. A subtrahend delay switch bank 39 having switches 39–0 through 39–9 therein is provided to control the connections of subtrahend delay line 38. One terminal of each of the subtrahend selection switches 39 is connected to the corresponding tap on subtrahend delay line 38, and the other terminals of switches 39 are connected in common to a conductor 40.

Conductor 40 leads to the input of a tens order borrow delay line 41 which, in the case of subtraction, needs only one delay section corresponding to a delay of one unit or section in the master delay line 21. Borrow delay line 41 may thus have a pair of output taps 41–0 and 41–1. The connections to the output taps of borrow delay line 41 are controlled by suitable means, such as a pair of AND gates 42*a* and 42*b* (Fig. 2*b*). AND gate 42*a* has one input connected to tap 41–0 through a conductor 44*a* and has its other input connected to a trigger circuit to be described below. When signals appear on both inputs to gate 42*a*, the gate is opened to supply a pulse through an OR gate 42*c* to a tens difference conductor 43. AND gate 42*b* has one input connected to tap 41–1 through a conductor 44*b* and has its other input connected to a trigger circuit to be described below, so that a pulse is supplied through OR gate 42*c* to conductor 43 when two input signals appear on gate 42*b*. With gate 42*a* open, conductor 40 is effectively connected through tap 41–0 and conductor 44*a* directly to conductor 43 leading to the difference circuits, so that the pulse from conductor 40 undergoes no delay in borrow delay line 41. When gate 42*b* is open, conductor 40 is effectively connected to conductor 43 through tap 41–1 and conductor 44*b*, so that the pulse from conductor 40 undergoes a delay of one unit in the borrow delay line.

For the hundreds order digits there is provided a minuend selection switch bank 45 (Fig. 2*a*) having switches 45–0 through 45–9 which each have one terminal connected to the corresponding taps on master delay line 21, in parallel with minuend selection switches 25 and 35 for the units and tens orders. The other terminals of switches 45–0 through 45–9 are connected in common to a conductor 46 whch is connected to the input of a hundreds order subtrahend delay line 48 having taps 48–0 through 48–9 corresponding to the delay sections therein. A subtrahend selection switch bank 49 has switches 49–0 through 49–9 therein, with one terminal of each of the switches connected to corresponding taps of subtrahend delay line 48. The other terminals of switches 49 are connected in common to a conductor 50 which leads to the input of a hundreds order borrow delay line 51. Borrow delay line 51, like the tens order borrow delay line 41, has two taps 51–0 and 51–1, and the connection of these taps to a conductor 53 is controlled by a pair of AND gates 52*a* and 52*b* and an OR gate 52*c* (Fig. 2*b*). Gate 52*a* receives one input from tap 51–0 through a conductor 54*a* and receives another input from a trigger circuit to be described below, while gate 52*b* receives one input from tap 51–1 through a conductor 54*b* and receives another input from a trigger circuit to be described. Thus, when gate 52*a* is open, the pulse from conductor 50 effectively by-passes borrow delay line 51 with no delay, and when gate 52*b* is open, the pulse undergoes a delay of one unit in borrow delay line 51.

From the description of the apparatus thus far it will be seen that there is provided a master delay line 21 through which the master input pulse from clock 23 travels. This pulse also travels in parallel through the different delay line taps to the closed minuend selection switches 25, 35 and 45 of the units, tens and hundreds orders, and then through the corresponding subtrahend delay lines 28, 38 and 48 and the closed subtrahend selection switches 29, 39 and 49. Each of the switches of the minuend selection switch banks 25, 35 and 45 are labeled and connected so that the number of delay sections connected upon closure of a given one of these switches corresponds to the nines complement of the digit represented by that switch. Each of the switches of the subtrahend selection switch banks 29, 39 and 49 are connected and labeled sequentially by number, so that the delay corresponds exactly with the switch digit. Thus, the pulses arriving on conductors 30, 40 and 50 will have been delayed by amounts corresponding to the respective sums of the delays in the units, tens and hundreds orders minuend and subtrahend sections. In the case of the tens and hundreds orders, the pulses on conductors 40 and 50 may undergo an additional delay in borrow delay lines 41 and 51, respectively, depending upon the conditions of AND gates 42*a*, 42*b*, 52*a* and 52*b*.

To understand how a measure of the differences represented by the pulses appearing on conductors 30, 43 and 53 is obtained, reference may be had to Figs. 2*b* and 2*c*. It will be remembered that sections 21–10 through 21–19 of master delay line 21 may, in practice, be a physical part of and continuous with sections 21–0 through 21–9 of this delay line, but for the purpose of clarity, sections 21–10 through 21–19 have been illustrated separately. For detecting the delay undergone by the pulses in the different sections of the subtracting apparatus of the present invention, there are provided a plurality of coincidence detection circuits shown as AND gates 61–0 through 61–19 (Fig. 2*c*). AND circuits 61 may be of any suitable type in which the simultaneous appearance of pulses on the two inputs thereof produces an output pulse from the device. In the embodiment illustrated, devices 61–0 through 61–19 each receive one input from the associated taps of master delay line 21. That is, coincidence circuit 61–0 receives one input from tap 21–0 of delay line 21, coincidence circuit 61–3 receives one input from tap 21–3 of delay line 21, etc. It will be seen that since coincidence circuits 61 are connected to like-numbered taps on delay line 21, the numbers of the different coincidence circuits represent the nines complement of the actual delays of the delay line taps to which they are connected.

The other input to each of AND gates 61–0 through 61–19 is supplied in common from a difference conductor 62 which has supplied thereto a signal representing the pulse whose delay time or difference is to be determined. In the example embodiment illustrated, the differences are adapted to be read out serially by order, that is, the units difference is read first, then the tens difference and then the hundreds difference. However, it will be understood that the differences may be read out in any desired order, or may be read out simultaneously. In the present case, conductor 62 may be connected by means of the arm **64*a* of a switch 64** (Fig. 2*b*) to a contact **64*b* which is connected to conductor 30 of the units difference, to thus connect conductor 30 to conductor 62 and coincidence circuits 61. Switch arm 64*a* may be moved to engage a contact 64*c* to connect conductor 43 of the tens order difference to conductor 62 and coincidence circuits 61. Switch arms 64*a* is also movable to engage a contact 64*d* which is connected to conductor 53 of the hundreds order difference to connect this conductor to conductor 62 and coincidence circuits 61. Switch 64 may be of any suitable type, such as a manual switch, but preferably it is a high speed mechanical or electrical switching means which operates to sequentially connect the difference conductors 30, 43 and 53 to the coincidence circuits. In general, the switching speed should be slower than the clock rate so that there is at least one difference signal during the time switch 64** remains in any one position.

The difference pulses from each of the conductors 30, 43 and 53 are sequentially supplied to all the coincidence circuits 61–0 through 61–19, but coincidence occurs only in the particular coincidence circuit which also has as the other input thereof a pulse coincident in time from the master delay line. The particular coincidence circuit which has the two simultaneous inputs produces an output pulse which is supplied to suitable utilization apparatus, such as a visual indicating mechanism or some type of an output device which prints or otherwise produces a record of the difference obtained.

In the embodiment illustrated in the drawings, it has been assumed that the differences are to be produced on a digitized basis, that is, on the basis of a radix of 10. To provide this digitization, there is provided a plurality of OR gates 66–0 through 66–9. These OR gates 66 each receive one input from AND gates 61–0 through 61–9, respectively, and one input from the output of AND gates 61–10 through 61–19, respectively. That is, gate 66–0 receives inputs from gates 61–0 and 61–10, gate 66–4 receives inputs from gates 61–4 and 61–14, etc. OR gates 66 are such that they produce an output pulse upon occurrence of an input pulse on either of the two input conductors. Thus, each of OR gates 66 produces an output pulse whenever either of their associated input conductors is energized, so that these output pulses appear whenever there is an output pulse from AND gates 61–0 through 61–19.

In considering the general problem of borrows, it will be apparent that borrows will be required under two conditions in a multi-order subtracting operation. One of such conditions occurs when a subtrahend digit is larger than the minuend digit. This, of course, requires a borrow of one from the next higher order. The other condition occurs when the difference in a given order is zero and there is a borrow from a prior order into the given order. This borrow makes the subtrahend larger than the minuend, thus producing a borrow in the given order which must be passed on to the next higher order.

To provide for borrows resulting when the subtrahend exceeds the minuend, there is provided a ten input, non-exclusive OR gate 55 (Fig. 2*c*). Device 55, as the name implies, receives ten input signals from the taps 21–10 through 21–19 of delay line 21, representing numbers from 10 to 19, and produces an output signal on a conductor 56 whenever any of its input conductors are energized. It will be seen that since the labeling and connection of the different taps of delay line 21 corresponds to the nines complement of the actual delay represented by the different taps, the appearance of pulses on any of difference conductors 30, 43 or 53 simultaneously with pulses on any of taps 21—10 through 21—19 indicates that the subtrahend digit exceeds the minuend digit in that particular order. The single output from device 55 is supplied through conductor 56 in parallel to the input of a (10–19) AND gate for each of the orders. Such AND gates include a units order AND gate 60 (Fig. 2*b*), a tens order AND gate 70, and a hundreds order AND gate 80. The other inputs to AND gates 60, 70 and 80 are supplied from the associated difference conductors 30, 43 and 53 for the respective orders. Thus, AND units 60, 70 and 80 will produce output pulses upon the simultaneous appearance of input pulses on the (10–19) conductor 56 and the associated difference conductors for the respective AND units. The simultaneous appearance of these input pulses for any of the different (10–19) AND gates 60, 70 and 80 indicates that the subtrahend digit exceeds the minuend digit for that particular order, thus necessitating a borrow from the next higher order.

The output pulses produced by AND units 60, 70, and 80 are supplied as inputs to borrow-triggers 62, 72 and 82, respectively. Triggers 62, 72 and 82 are preferably of the bi-stable type which produce a continuous output signal on one or the other of their output conductors and which are operative to change the energized output conductor upon receipt of an input pulse. Triggers 62, 72 and 82 may be reset by means of a signal supplied from a common reset line 65.

Trigger 62 has two output lines, represented by conductors 68 and 69, which are connected to the respective inputs of AND gates **42*a* and 42*b*. Conductor 68 is energized when trigger 62 is in a reset state so that under these conditions a pulse from conductor 40 passes through AND gate 42*a* and OR gate 42*c* to conductor 43. When trigger 62 is switched by receipt of a pulse from unit 60, conductor 68 is de-energized and conductor 69 is energized to supply an input to AND gate 42*b*. Thus, pulses from conductor 40 pass through delay line 41 and AND gate 42*b* to OR gate 42*c* and conductor 43 when trigger 62 is switched. When reset conductor 65 is energized, trigger 62 de-energizes conductor 69 and again energizes conductor 68**.

To provide for borrows resulting from borrows from the preceding order, there is provided a second series of AND gates 73 and 83. AND gates 73 and 83 each receive one input from a conductor 59 which is connected to the tap 21–0 of master delay line 21. The other inputs to each of AND gates 73 and 83 are supplied from the associated difference conductors 43 and 53 for the tens and hundreds orders, respectively. From a study of the connection of the delay elements and an understanding of the nines complement method, it will be seen that whenever the subtrahend and minuend digits for a given order are equal, representing a difference of zero for that order, the pulse for that order will reach the difference conductor at the same time the master clock pulse reaches tap 21–0. Thus, the simultaneous arrival of pulses on any of the difference conductors 30, 43 or 53 and tap 21–0 indicates a difference of zero in that particular order. Accordingly, AND gate 73 or AND gate 83 will produce an output pulse when there is a difference of zero between the minuend and subtrahend digits for that particular order.

The output pulse from AND gate 73 is supplied as the single input to a tens (0) trigger 74, and the output pulse from AND gate 83 is supplied as the single input to a hundreds (0) trigger 84. Triggers 74 and 84, when energized by an input pulse, produce a continuous output signal until reset, so that upon appearance of an output pulse from AND gates 73 or 83, the associated one of triggers 74 and 84 produces a continuous output signal. The output signal from trigger 74 is supplied as one input to a tens-borrow AND gate 75. The other input to AND gate 75 is supplied from the units-borrow trigger 62 by way of conductor 69, so that upon the simultaneous appearance of output signals from triggers 62 and 74, AND gate 75 is energized to produce an output signal which is supplied through a conductor 76 to the input of the tens-borrow trigger 72.

Trigger 72 has two output lines, represented by conductors 78 and 79, which are connected to the respective inputs of AND gates 52*a* and 52*b*. Conductor 78 is energized when trigger 72 is in a reset condition, so that under these conditions a pulse from conductor 50 passes through tap 51–0 and gate 54*a* to OR gate 52*c* and conductor 53. When trigger 72 is switched by the simultaneous appearance of output signals from devices 70 and 75, conductor 78 is de-energized and conductor 79 is energized to supply an input to AND gate 54*b*. This opens gate 54*b* so that pulses then pass from conductor 50 through delay line 51 to tap 51–1, gate 54*b* and OR gate 54*c* to conductor 53.

Similarly, hundreds order (0) trigger 84 supplies an output signal to one input of a hundreds-borrow AND network 85. The other input to AND network 85 is supplied through conductor 79 from the output of tens-borrow trigger 72, so that AND network 85 produces an output signal upon the simultaneous appearance of input signals from tens-borrow trigger 72 and hundreds (0) trigger 84. The output pulse from AND network 85 is supplied through a conductor 86 as one input to the hundreds-borrow trigger 82. Hundreds-borrow trigger 82 receives this input, together with an input from the hundreds (10–19) AND gate 80, and is operable to produce an output signal which is continuous until reset. The output from hundreds-borrow trigger 82 is supplied, in the case of additional orders being utilized, to the borrow delay line control and the corresponding borrow AND gate for the next highest order, i.e., the thousands order.

The operation of the present invention can perhaps best be understood by reference to the timing diagram of Fig. 1, illustrating the relationships between the pulses and signals in the different circuits when performing a representative subtracting operation. For the purpose of clarity, two time scales are shown on the top of the timing diagram of Fig. 1. One scale is the "real time," representing the actual time along delay line 21, and the other scale is "apparent time," representing the time scale according to the nines complement labeling of delay line 21 and the minuend selection switches 25, 35 and 45. In the timing diagram of Fig. 1, it is assumed that a subtrahend of 286 is to be subtracted from a minuend of 482. To enter the minuend of 482 in the apparatus, switch 45–4 of the hundreds minuend selection switch bank, switch 35–8 of the tens minuend selection switch bank, and switch 25–2 of the units minuend selection switch bank are closed. To enter the subtrahend of 286 into the apparatus, switch 49–2 of the hundreds subtrahend selection switch bank, switch 39–8 of the tens subtrahend selection switch bank, and switch 29–6 of the units subtrahend selection switch bank are closed. After this entering of the minuend and subtrahend numbers, clock 23 may be energized to deliver input pulses to the input of master delay line 21.

With respect to the hundreds section, the master clock pulse travels through delay line 21 to tap 21–4, then travels to the closed minuend selection switch 45–4 in the hundreds section and then through conductor 46 to the input of subtrahend delay line 48. The pulse then travels through delay line 48 to tap 48–2 thereof, then through the closed subtrahend selection switch 49–2 to conductor 50. Since tap 21–4 and switch 45–4 represent a "real" time of five units of delay, owing to the nines complement method utilized in the present invention, the pulse undergoes five units of delay in the hundreds minuend section and an additional two units of delay in the hundreds subtrahend section for a total of seven units of delay. This pulse thus arrives on conductor 50 at "7" time in real time and at "2" time in apparent time. At "7" real time in the first cycle, gate 52*a* is open so that the pulse on conductor 50 passes through gates 52*a* and 52*c* to conductor 53 without undergoing any delay in the hundreds borrow delay line 51. The pulse is thus supplied from conductor 53 to one input of each of AND gates 80 and 83 at "7" time in real time and "2" time in apparent time, as shown by the timing diagram of Fig. 1*g*.

Next considering the tens order minuend and subtrahend sections, the master pulse traveling through master delay line 21 will branch off at tap 21–8 of this delay line and flow through the closed tens order minuend selection switch 35–8 to conductor 36. From conductor 36 the pulse travels through eight sections of subtrahend delay line 38 to tap 38–8 and then through the closed subtrahend selection switch 39–8 to conductor 40. At this time, gate 42*a* is open and gate 42*b* is closed, so that the pulse travels directly through conductor 44*a* and gate 42*a* to OR gate 42*c* and conductor 43, thus by-passing the single section of the tens-borrow delay line 41. The pulse arriving on conductor 43 thus has been delayed by one unit in the minuend section, correspond to the nines complement of the tens minuend digit, and has been delayed an additional eight units in the subtrahend section for a total of nine units. This pulse thus arrives on conductor 43 at "9" time in "real" time and "0" time in "apparent" time.

This pulse arrives at the input to the tens (0) AND network 73 at "0" time in "apparent" simultaneously with the arrival at this AND network of a pulse on the (0) conductor 59 from the tap 21–0 of master delay line 21, as shown by the timing diagram of Fig. 1*c*. The simultaneous appearance of two input signals on AND network 73 indicates the possibility of a borrow from a borrow and causes this network to supply an output pulse to fire the tens (0) trigger 74, which at this time produces a continuous output signal, as shown in Fig. 1*d* of the timing diagram. The output from tens (0) trigger 74 is supplied as one input to the tens-borrow AND network 75. In this connection, it will be noted that at the time of generation of the output signal from trigger 74 in the first cycle, i.e., "0" apparent time, the units-borrow trigger 62 has not yet been fired, so that at "0" apparent time there is only one input and AND network 75 and hence network 75 does not produce an output pulse at this time.

The pulse on conductor 43, which has been delayed a total of nine units, is also supplied as one input to the tens (10–19) AND gate 70. The other input to this AND network 70 is supplied by way of conductor 56 from the output of OR gate 55. However, since the pulse from conductor 43 arrives at gate 70 at "9" real time, whereas no pulses arrive at the other input to gate 70 from conductor 56 before "10" real time, there is no coincidence of input pulses on gate 70, and this gate is not opened.

With respect to the units order, the pulse from clock 23 travels through delay line 21 until it reaches tap 21–2, at which time a portion of the pulse leaves the delay line and travels through closed minuend selection switch 25–2 to conductor 26 and the input of subtrahend delay line 28. The pulse then travels through delay line 28 until it reaches tap 28–6 from where it goes through closed subtrahend selection switch 29–6 to units difference conductor 30. At this time, the pulse has been delayed by seven units in the minuend portion of delay line 21, representing the nines complement of the units minuend digit, and an additional six units in subtrahend delay line 28, or a total delay of thirteen units. This is shown in the timing diagram of Fig. 1*a*, illustrating the arrival of this pulse on conductor 30 at "13" real time and "16" apparent time. This pulse is also supplied as one input to the units (10–19) AND gate 60, since conductor 30 is connected as one input to AND gate 60.

The portion of the master input pulse from clock 23 which continues on through master delay line 21 thus arrives at tap 21–16 of line 21 simultaneously with the appearance on conductor 30 of the pulse delayed by thirteen units in the units section. This pulse from tap 21–16 is supplied through the ten input OR gate 55 to conductor 56 where it is supplied as the other input to the units (10–19) AND gate 60. AND gate 60 thus has two inputs thereon at "13" real time and "16" apparent time, so that it produces an output pulse to the units-borrow trigger 62 at this time. Thus, as shown by the timing diagram of Fig. 1*b*, trigger 62 is rendered conductive at "13" real time to supply a continuous output signal until it is reset. This continuous output signal from the units-borrow trigger 62 is supplied as one input to the tens-borrow AND network 75.

Summarizing the operation of the tens and units sections at this time, the tens (0) trigger 74 is fired at "0" apparent time ("9" real time) and the output thereof supplied as one input to the tens-borrow AND network 75, thus preparing network 75 for the generation of a borrow resulting from a borrow if there is a borrow produced in the prior order, i.e., the units order. Since this borrow from the prior order is produced at "16" apparent time ("13" real time) by the units-borrow trigger 62, the tens-borrow AND network 75 is energized by the simultaneous appearance of two input signals thereon at "16" apparent time to produce an output pulse which is supplied through conductor 76 to the input of the tens-borrow trigger 72. Trigger 72 thus fires at "16" apparent time, as shown by the timing diagram of Fig. 1*f*, to de-energize conductor 78 and energize conductor 79.

This action of trigger 72 closes gate 52*a* and opens gate 52*b* to thereafter introduce the delay of delay line 51 in any pulse traveling between conductor 50 and conductor 53. However, it will be noted that since the first cycle pulse on conductor 50 of the hundreds order section passed therethrough at "2" apparent time ("7" real time), while gate 52*a* was open, the generation of the borrow from the tens order at "16" apparent time ("13" real time) is ineffective to enter this borrow into the hundreds difference pulse on conductor 53 during the first cycle of the apparatus and such entering must await the second cycle.

Thus, at the end of the first cycle of the apparatus of the present invention, the differences have been generated in the three orders shown and the borrows have been generated. In this particular example, owing to the relative times of generation of the borrows and the differences, the borrows have not been entered in the differences on the first cycle, since these differences occurred prior to the generation of the borrows. That is, at the end of the first cycle the units order difference digit is indicated as the digit "6" in the apparent "16" time, which is the correct difference since there is no carry from a preceding order for the units order. For the tens order, on the first cycle the difference is indicated at 0, which is the correct difference for the minuend and subtrahend of the tens order but does not take into account the borrow resulting from the fact that the subtrahend exceeds the minuend in the units order. Similarly, in the hundreds order at the end of the first cycle, the indicated difference is 2, which is the correct difference for the minuend and subtrahend of the hundreds order, but does not take into account the borrow from the tens order resulting, in turn, from the borrow from the units order. The first cycle differences will be supplied to coincidence circuits 61, which together with OR gates 66, will produce outputs indicating the values of these differences without borrows, but these output indications do not represent the true differences on the first cycle and hence they are not utilized.

The apparatus of the present invention will produce the correct difference on the second and all subsequent cycles, taking into account the effects of borrows generated during the first cycle. The second cycle is preferably initiated automatically at the end of the first cycle, since clock 23 may be designed to repetitively produce output pulses having a predetermined frequency. Thus, as the output pulse from clock 23 for the second cycle travels through delay line 21, it again undergoes 13 units of delay in the units delay section. This delay causes this pulse to arrive at coincidence circuit 61–16 simultaneously with the pulse from tap 21–16 of delay line 21, since the pulse also appears at "16" apparent time. This causes circuit 61—16 to produce an output pulse at "16" apparent time, as shown in Fig. 1*h*. The output from circuit 61–16 will appear as a 6 from OR gate 66–6, where the difference is to be produced on a digitized basis, as in the illustrated embodiment.

For the tens order, the pulse undergoes a delay of 1 unit in the minuend delay section and 8 units in the subtrahend delay section as in the first cycle. However, since AND gate 42*a* closed and AND gate 42*b* opened at "16" apparent time ("13" real time) in the first cycle, the second cycle pulse on conductor 40 travels through the single section of delay line 41 to AND gate 42*b* and OR gate 42*c* to conductor 43. Thus, this additional one unit of delay in the tens order borrow delay line 41 causes the difference pulse to reach conductor 43 at "19" apparent time ("10" real time). This difference pulse on conductor 43 at "19" apparent time is supplied to coincidence circuits 61, where it coincides in time with the master pulse from tap 21–19 to produce coincidence in device 61–19, as shown in Fig. 1*i*. This device produces an output to the digitizing OR gate 66–9, which produces a 9 output representing the proper digit for the difference in the tens order.

In the hundreds order section, the second cycle pulse again undergoes a delay of 5 units in the minuend delay section and a delay of 2 units in the subtrahend delay section, for a total delay of 7 units, as in the first cycle. However, since AND gate 52*a* was closed and AND gate 52*b* opened at "16" apparent time in the first cycle, the second cycle pulse on conductor 50 must travel through delay line 51 to gate 52*b*. This hundreds difference pulse on conductor 50 thus undergoes an additional one unit of delay in the hundreds borrow delay line 51, so that it arrives on the hundreds sum conductor 53 at "1" apparent time ("8" real time), representing the correct difference for the hundreds digits, taking into account the borrow from the tens order. This pulse on conductor 53 is supplied to coincidence circuits 61 and its arrival at these circuits coincides in time with the arrival at gate 61–1 of the pulse from tap 21–1 of delay line 21, so that gate 61–1 produces an output pulse which is supplied to digitizing OR gate 66–1.

It will thus be seen that the apparatus of the present invention operates to produce a true difference in only two cycles, regardless of the number of borrows involved. On the second and all subsequent cycles, therefore, the apparatus will supply through OR gates 66 signals representing the digits of the difference between minuend and subtrahend, and the apparatus will continue to supply these output signals repetitively until it is reset or until a new set of numbers is entered on the minuend and subtrahend switches.

In the above described embodiment the three orders shown were labeled units, tens, and hundreds, respectively, in order to illustrate clearly the operation of the apparatus in performing a representative arithmetic operation. However, it will be understood that the invention is operative to perform subtraction utilizing any number of orders desired, and that regardless of the number of such orders utilized in the operation, the apparatus of the present invention will produce an indication of the difference between these numbers in two cycles, taking into account the effects of borrows from preceding orders and entering these borrows on the second and all subsequent cycles. Further, although the illustrated embodiment utilized a serial read-out of the differences by order, it will be apparent to those skilled in the art that by suitable modification of the apparatus the differences from all orders can be read out simultaneously if desired. Similarly, although the invention has been illustrated in connection with a system employing a radix of ten, it will be apparent that the invention may be utilized in a system which is based on some other radix. It will also be apparent to those skilled in the art that other types of delay lines, such as acoustic delay lines, may be substituted for the electrical delay lines shown in the illustrated embodiment.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for performing arithmetic subtraction comprising a group of delay elements, said group representing a given numerical order in said subtraction and said group having a minuend section and a subtrahend section, means for supplying a clock pulse to said group of delay elements, means for delaying said pulse in said minuend section by an amount proportional to the nines complement of the minuend digit, means for additionally delaying said pulse in said subtrahend section by an amount proportional to the subtrahend digit, means for determining the sum of the delays undergone by said pulse in said minuend and said subtrahend sections, and means for indicating said sum in terms of the nines complement of said sum to indicate the difference between said minuend and said subtrahend digits.

2. Apparatus in accordance with claim 1 wherein said delay elements are electrical delay elements.

3. Apparatus in accordance with claim 1 wherein said delay elements are acoustic delay elements.

4. Apparatus for performing arithmetic subtraction comprising a plurality of groups of delay elements, each of said groups representing a different numerical order in said subtraction and each of said groups having a minuend section and a subtrahend section, means for supplying a clock pulse in parallel to each of said groups of delay elements, means for delaying said pulse in each of said minuend sections by amounts of proportional to the nines complement of the minuend digit for each of said orders, means for additionally delaying said pulse in each of said subtrahend sections by amounts proportional to the subtrahend digit for each of said orders, means for determining the sum of delays undergone by said pulse in each of said orders, and means for indicating said sum in each of said orders in terms of the nines complement of said sum to indicate the difference between the minuend and the subtrahend digits for each of said orders.

5. Apparatus in accordance with claim 4 wherein said delay elements are electrical delay elements.

6. Apparatus in accordance with claim 4 wherein said delay elements are acoustic delay elements.

7. Apparatus for performing subtraction comprising a plurality of groups of delay elements, each of said groups representing a different numerical order in said subtraction and each of said groups having a minuend section and a subtrahend section, means for supplying a clock pulse in parallel to said groups of delay elements, means for delaying said pulse in each of said minuend sections by amounts proportional to the nines complement of the minuend digit for each of said orders, means for additionally delaying said pulse in each of said subtrahend sections by amounts proportional to the subtrahend digit for each of said orders, borrow delay means for each of said groups of delay elements for introducing into each of said orders an additional delay representing a borrow, first borrow control means responsive to a subtrahend digit larger than a minuend digit in a given order for energizing said borrow delay means to introduce a borrow delay into the order following said given order, second borrow control means responsive jointly to a difference of zero in a given order and a borrow from the order preceding said given order for energizing said borrow delay means to introduce a borrow delay into the order following said given order, means for determining the sum of the delays undergone by said pulse in each of said orders, and means for indicating said sum for each of said orders in terms of the nines complement of said sum to indicate the difference between the minuend and the subtrahend for each of said orders.

8. Apparatus in accordance with claim 7 wherein said delay elements are electrical delay elements.

9. Apparatus in accordance with claim 7 wherein said delay elements are acoustic delay elements.

10. Apparatus for electrically performing subtraction comprising a plurality of groups of electrical delay elements, each of said groups representing a different numerical order in said subtraction and each of said groups having a minuend section and a subtrahend section, means for supplying a clock pulse in parallel to said groups of delay elements, means for delaying said pulse in each of said minuend sections by amounts proportional to the nines complement of the minuend digit for each of said orders, means for additionally delaying said pulse in each of said subtrahend sections by amounts proportional to the subtrahend digit for each of said orders, borrow delay means for each of said groups of delay elements for introducing into each of said orders an additional delay representing a borrow, first borrow control means responsive to a subtrahend larger than a minuend in a given order for connecting said borrow delay means in the said group of delay elements following said given order to introduce a borrow delay into said order following said given order, second borrow control means responsive jointly to a difference of zero in a given order and a borrow from the order preceding said given order for connecting said borrow delay means in the group of delay elements following said given order to introduce a borrow delay into said order following said given order, means for determining the sum of the delays undergone by said pulse in each of said orders, and means for indicating said sum for each of said orders in terms of the nines complement of said sum to indicate the difference between the minuend and the subtrahend for each of said orders.

11. Apparatus for electrically performing subtraction comprising a plurality of groups of electrical delay elements, each of said groups representing a different numerical order in said subtraction and each of said groups having a minuend section and a subtrahend section, means for supplying a clock pulse in parallel to said groups of delay elements, means for delaying said pulse in each of said minuend sections by amounts proportional to the nines complement of the minuend digit for each of said orders, means for additionally delaying said pulse in each of said subtrahend sections by amounts proportional to the subtrahend digit for each of said orders, borrow delay means for each of said groups of delay elements for introducing into each of said orders an additional delay representing a borrow, first borrow control means responsive to a subtrahend larger than a minuend in a given order for connecting said borrow delay means to the subtrahend section of the order following said given order to introduce a borrow delay into said order following said given order, second borrow control means responsive jointly to a difference of zero in a given order and a borrow from the order preceding said given order for connecting said borrow delay means to the subtrahend section of the order following said given order to introduce a borrow delay into said order following said given order.

References Cited in the file of this patent

UNITED STATES PATENTS 2,729,811 Gloess ---------------- Jan. 3, 1956

UNITED STATES PATENT OFFICE

CERTIFICATE OF CORRECTION

Patent No. 2,920,822 January 12, 1960

John H. Gallichotte

It is hereby certified that error appears in the printed specification of the above numbered patent requiring correction and that the said Letters Patent should read as corrected below.

Column 8, line 51, after "total" insert -- delay --; line 55, after "apparent" insert -- time, --; line 68, for "cycle, i.e.," read -- cycle, i.e., at --; line 70, for "and AND" read -- to AND --.

Signed and sealed this 19th day of July 1960.

(SEAL)

Attest:

KARL H. AXLINE
Attesting Officer

ROBERT C. WATSON
Commissioner of Patents